(12) United States Patent
Stankowiak et al.

(10) Patent No.: US 6,277,345 B1
(45) Date of Patent: Aug. 21, 2001

(54) PROCESS FOR THE PURIFICATION OF GASES

(75) Inventors: Achim Stankowiak; Horst Streitberger, both of Altötting; Michael Wyschofsky, Dortmund, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/448,104

(22) Filed: Nov. 23, 1999

(30) Foreign Application Priority Data

Nov. 25, 1998 (DE) ............................................ 198 54 353

(51) Int. Cl.$^7$ ...................................................... C10L 3/10
(52) U.S. Cl. .................. 423/210; 423/220; 423/228; 423/229; 423/236; 423/242.7; 423/245.3; 48/127.5; 48/198.3; 252/182.12
(58) Field of Search .................................... 423/220, 228, 423/229, 236, 242.7, 245.2, 210; 252/182.12; 48/127.5, 198.3

(56) References Cited

U.S. PATENT DOCUMENTS

| | | | |
|---|---|---|---|
| 3,622,267 | * 11/1971 | Bartholome et al. | 23/2 R |
| 3,716,620 | 2/1973 | Deschamps et al. | 423/228 |
| 4,551,158 | * 11/1985 | Wagner et al. | 55/46 |
| 4,705,673 | 11/1987 | Capobianco et al. | 423/229 |
| 5,589,149 | * 12/1996 | Garland et al. | 423/242.4 |
| 5,705,090 | * 1/1998 | Garland et al. | 252/184 |
| 5,877,386 | * 3/1999 | Schubert | 585/860 |

FOREIGN PATENT DOCUMENTS

| | | |
|---|---|---|
| 39 22 904 A1 | 1/1991 | (DE) . |
| 0 452 694 A2 | 10/1991 | (EP) . |
| WO 95/13128 | 5/1995 | (WO) . |

OTHER PUBLICATIONS

EPO Search Report.
Derwent Patent Family Abstract for DE 39 22 904.

* cited by examiner

Primary Examiner—Steven P. Griffin
Assistant Examiner—Timothy C Vanoy
(74) Attorney, Agent, or Firm—Susan S. Jackson; Scott E. Hanf

(57) ABSTRACT

The present invention relates to the use of an absorption liquid for purifying a gas by removal of gaseous, acidic impurities. The gas to be purified can be any gas, such as synthesis gas or natural gas, which contains gaseous, acidic impurities such as $CO_2$, $H_2S$, $SO_2$, $CS_2$, HCN, COS or mercaptans. The absorption liquid comprises:

Figure 1:
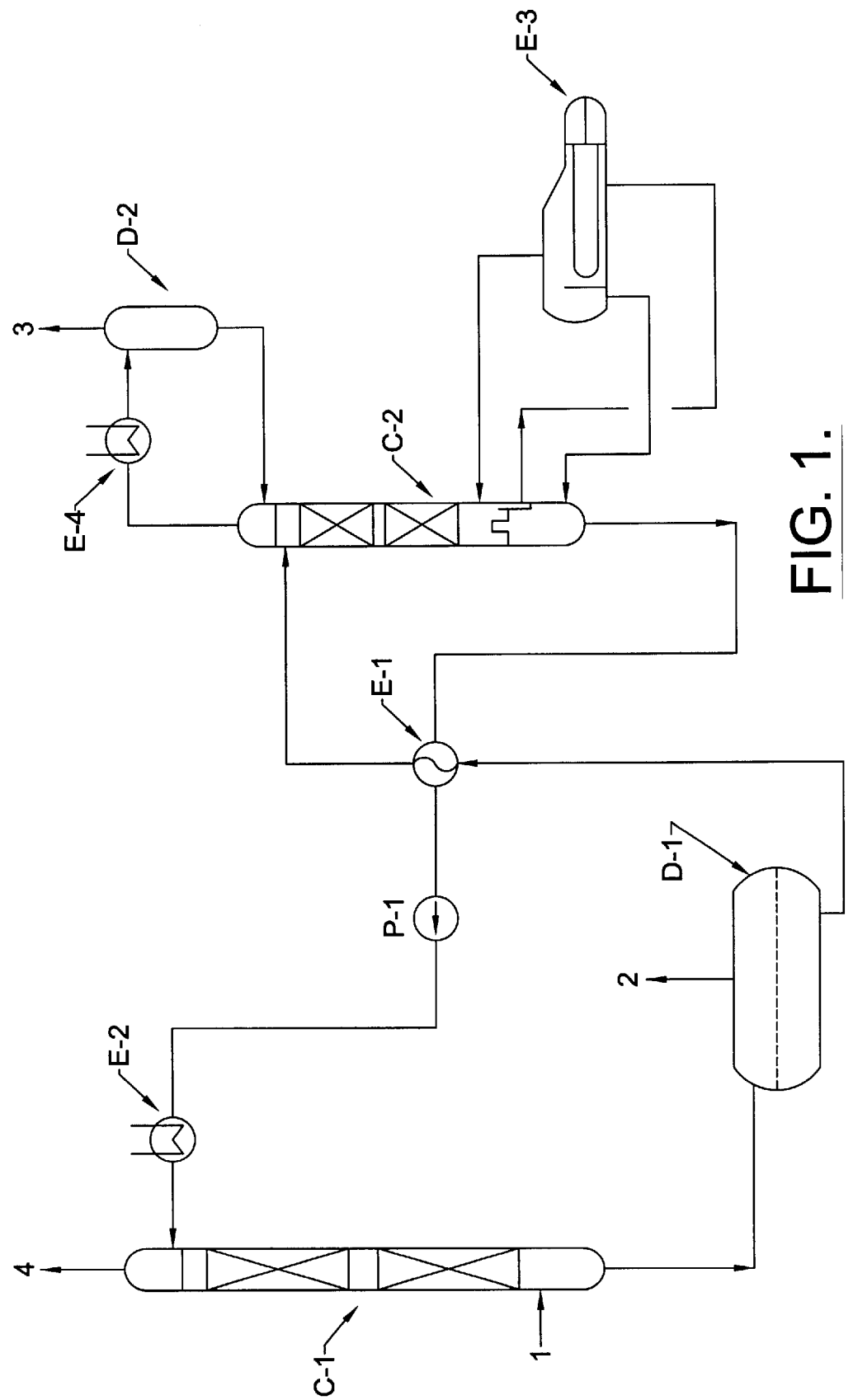

A) from 0.01 to 4% by weight of at least one compound of the formula

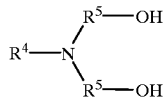

B) from 0.001 to 8.0% by weight of water, and
C) at least one polyalkylene glycol alkyl ether of the formula $$R^1\text{—}O\text{—}(R^2\text{—}O)_x\text{—}R^3$$

to 100% by weight,
where
$R^1$ is $C_1$–$C_4$-alkyl,
$R^2$ is ethylene or 2-methylethylene,
$R^3$ is hydrogen or $C_1$–$C_4$-alkyl,
$R^4$ is hydrogen or $C_1$–$C_4$-alkyl,
$R^5$ is $C_1$–$C_4$-alkylene and
X is an integer from 1 to 10. The amine may be N-methyldiethanolamine and the ether may be polyethylene glycol dimethyl ether.

14 Claims, 1 Drawing Sheet

PROCESS FOR THE PURIFICATION OF GASES

FIELD OF THE INVENTION

The present invention relates to the use of alkanolamines for freeing gases of acid-forming impurities, and also to a suitable absorption liquid.

DESCRIPTION OF THE RELATED ART

Gases of widely varying origins, for example natural gas or synthesis gas, contain gaseous, acid-forming impurities such as $CO_2$, $H_2S$, $SO_2$, $CS_2$, HCN, COS or mercaptans. The removal of the impurities mentioned is generally necessary because of the further use to which the gases are put. If the gases are burnt, regulations which limit sulfur emissions have to be observed. High $CO_2$ contents reduce the calorific value. Mercaptans have to be removed because of their odor and their toxicity. If the gases are used for chemical processes, the impurities are often troublesome catalyst poisons. In addition, the acidic impurities cause corrosion of components which come into contact with the gases.

Processes for removing such impurities are described in the prior art.

U.S. Pat. No. 3,716,620 discloses a process for removing mercaptans by bringing the gases into contact with a solution of iodine and amines.

WO-A-95/13128 discloses a process for freeing gases of acidic impurities by bringing the gases into contact with a solution comprising from 10 to 98% by weight of a polyethylene glycol alkyl ether, from 1 to 20% by weight of secondary monoalkanolamine and, if desired, from 10 to 60% by weight of a dialkanolamine.

The processes of the prior art require large amounts of basic alkanolamines. It is an object of the present invention to provide a process for freeing gases of acidic impurities which makes do with small amounts of alkanolamines.

It has now surprisingly been found that dialkanolamines dissolved in polyalkylene glycol alkyl ethers in the presence of small amounts of water in very low concentrations effectively remove the acidic impurities, in particular hydrogen sulfide, from gases. The increased effectiveness of the absorption liquid of the invention makes it possible to operate gas scrubbing plants using smaller amounts of absorption liquid or to increase the gas throughput.

SUMMARY OF THE INVENTION

The invention provides for the use of an absorption liquid for freeing gases of gaseous, acidic impurities, wherein the absorption liquid comprises A) from 0.01 to 4% by weight of at least one compound of the formula

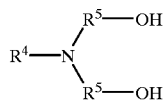

B) from 0.001 to 8.0% by weight of water, and

C) at least one polyalkylene glycol alkyl ether of the formula

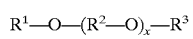

to 100% by weight, where
$R^1$ is $C_1$–$C_4$-alkyl,
$R^2$ is ethylene or 2-methylethylene,
$R^3$ is hydrogen or $C_1$–$C_4$-alkyl,
$R^4$ is hydrogen or $C_1$–$C_4$-alkyl,
$R^5$ is $C_1$–$C_4$-alkylene and
X is an integer from 1 to 10.

The gases to be purified can be any gases which contain such impurities and which themselves do not react with the absorption liquid. The absorption liquid is particularly suitable for the purification of natural gas and synthesis gas.

The impurities which are to be removed by the process of the invention are acid-forming and in the form of a gas of vapor. In particular, they are $CO_2$, $H_2S$, $SO_2$, $CS_2$, HCN, COS or lower mercaptans having $C_1$–$C_8$-hydrocarbon radicals.

The present invention is described in the German priority application No. 198 54 353.0, filed Nov. 25, 1998, which is hereby incorporated by reference as is fully disclosed herein.

DESCRIPTION OF THE PREFERRED EMBODIMENTS

The absorption liquid comprises at least one polyalkylene glycol alkyl ether and at least one dialkanolamine, plus water. In a preferred embodiment of the invention, $R^1$ and $R^3$ are methyl or butyl or $R^1$ is methyl or butyl and $R^3$ is hydrogen. $R^2$ is preferably an ethylene radical. X is preferably from 2 to 8.

In a preferred embodiment, $R^4$ is methyl. $R^5$ is preferably methylene or ethylene, in particular ethylene. A particularly preferred dialkanolamine is N-methyidiethanolamine. The dialkanolamine content of the absorption liquid is preferably from 0.1 to 2% by weight, in particular from 0.2 to 0.99% by weight, especially from 0.25 to 0.7% by weight and particularly preferably from 0.3 to 0.6% by weight. In a further preferred embodiment of the invention, the absorption liquid contains from 0.005 to 5% by weight, in particular from 0.01 to 1% by weight, of water.

The scrubbing of the gas can be carried out at atmospheric or superatmospheric pressure. If the scrubbing of the gas is carried out under superatmospheric pressure, preference is given to pressures up to 100 atmospheres.

The scrubbing of the gas can be carried out at temperatures above the solidification point of the absorption liquid. Preference is given to the temperature range from 20 to 100° C.

The invention further provides an absorption liquid for acidic impurities in the form of gas or vapor, comprising A) from 0.01 to 4% by weight of at least one compound of the formula

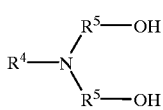

B) from 0.001 to 8.0% by weight of water, and

C) at least one polyalkylene glycol alkyl ether of the formula

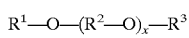

to 100% by weight, where
- $R^1$ is $C_1$–$C_4$-alkyl,
- $R^2$ is ethylene or 2-methylethylene,
- $R^3$ is hydrogen or $C_1$–$C_4$-alkyl,
- $R^4$ is hydrogen or $C_1$–$C_4$-alkyl,
- $R^5$ is $C_1$–$C_4$-alkylene and
- X is an integer from 1 to 10.

The preferred embodiments of the absorption liquid of the invention have already been described.

The invention also provides a process for the purification of gases, which comprises bringing the gases into contact with the absorption liquid of the invention at temperatures of from 20 to 100° C. and pressures of from 1 to 100 atmospheres.

EXAMPLES

The effectiveness of the absorption liquid of the invention is illustrated by two experiments carried out on a pilot plant, see FIG. 1.

A crude synthesis gas (crude gas for short) produced in a gasification plant was introduced under a pressure of 24 bar and a temperature of about 30° C. into the bottom of the absorption column C-1.

The crude gas had the following composition:

| | | |
|---|---|---|
| $H_2S$ | ppm by volume | 480 |
| $CO_2$ | % by volume | 20.7 |
| $CH_4$ | % by volume | 5.6 |
| $H_2$ | % by volume | 40.7 |
| CO | % by volume | 33.0 |

The $H_2S$ content could be set by means of a metered-addition station.

Mode of Operation of the Absorption Plant

In the absorber C-1, $H_2S$ is scrubbed out to trace levels by countercurrent contact with absorptioni liquid. The loaded absorption liquid leaves the bottom of the absorber and is depressurized in the Flash Tank D-1. Here, the dissolved components $CH_4$, $H_2$ and CO, and also part of the dissolved $CO_2$, are given off. The largely degassed absorption liquid is preheated by passage through the circulation exchanger E-1 and goes to the top of the regeneration column C-2. Here, $H_2S$ and remaining $CO_2$ are driven from the absorption liquid to trace levels by thermal stripping with steam. The required amount of regeneration steam is generated in the vaporizer E-3. The fully regenerated absorption liquid is then precooled by passage through the circulation exchanger E-1, goes to the circulation pump P-1 and is conveyed via the water cooler E-2 at a temperature of about 30° C. to the top of the absorption column C-1. The desorption gas is conveyed via the dephlegmator E-4 and separator D-2 to the battery limits and is worked up together with the flash gas in a sulfur recovery plant.

Two experiments were carried out under the same boundary conditions; these experiments were run to various points in time using different absorbents.

The purpose of the experiments was to show that when an absorption liquid according to the invention is used, the amount of liquid circulated can be reduced compared to the prior art.

Experiment 1 (Comparative Example)

This was carried out using a polyethylene glycol dimethyl ether (PEGDME) having a molar mass of about 270, commercially available as GENOSORB® 1753 from Clariant.

Experiment 2 (Example According to the Invention)

This was carried out using a mixture of the same PEGDME as in Experiment 1 with 0.6% by weight of methyldiethanolamine and 5% by weight of water. The boundary conditions which were kept the same in both experiments were the following parameters:

1. Amount of crude gas
2. Crude gas composition, including $H_2S$ content
3. $H_2S$ content of the purified gas
4. Temperature of the crude gas at the inlet to the absorber
5. Temperature of the regenerated solvent at the feed point to the absorber
6. Water content of the regenerated solvent
7. Stripping steam ratio in the thermal regeneration As target parameter for the respective test run, the circulation of the absorption liquid is determined.

Experimental Results

The following numbers are based on statistical data which were in each case determined from on-line measurements during a relatively long test run (at least 8 hours):

| | | Experiment I | Experiment II |
|---|---|---|---|
| Crude gas | Standard m³/h | 370 | 370 |
| Crude gas | ° C. | 32 | 32 |
| $H_2S$ in the crude gas | ppm by volume | 480 | 480 |
| $H_2S$ in the purified gas | ppm by volume | 11 | 11 |
| Solvent | m³/h | 2.2 | 2.0 |
| Solvent | ° C. | 30 | 30 |

The experimental results show that a circulation of the absorption liquid of the invention which is 10% higher than the circulation of the absorption liquid of the prior art gives the same effectiveness of gas scrubbing. Under these conditions, the absorption liquid of the invention allows a reduction of 10% in the amount of liquid.

What is claimed is:

1. A process for purifying a gas by removal of gaseous, acidic impurities, comprising treating said gas with an absorption liquid, which consists essentially of A) from 0.01 to 4% by weight of at least one compound of the formula $$R^4-N\begin{matrix}R^5-OH\\R^5-OH\end{matrix}$$

B) from 0.001 to 8.0% by weight of water, and
C) at least one polyalkylene glycol alkyl ether of the formula

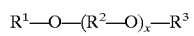

to 100% by weight,
where
- $R^1$ is $C_1$–$C_4$-alkyl,
- $R^2$ is ethylene or 2-methylethylene,
- $R^3$ is hydrogen or $C_1$–$C_4$-alkyl, $R^4$ is hydrogen or $C_1$–$C_4$-alkyl, $R^5$ is $C_1$–$C_4$-alkylene and X is an integer from 1 to 10.

2. The process as claimed in claim 1, wherein the gas to be purified is natural gas or synthesis gas.

3. The process as claimed in claim 1, wherein the impurities are $CO_2$, $H_2S$, $SO_2$, COS, $CS_2$, HCN or a mercaptan having a $C_1$–$C_8$-hydrocarbon radical.

4. The process as claimed in claim 1, wherein $R^1$ is methyl or butyl.

5. The process as claimed in claim 1, wherein $R^3$ is hydrogen, methyl or butyl.

6. The process as claimed in claim 1, wherein X is from 2 to 8.

7. The process as claimed in claim 1, wherein $R^4$ is methyl.

8. The process as claimed in claim 1, wherein $R^5$ is a methylene or ethylene radical.

9. The process as claimed in claim 1, wherein the absorption liquid contains from 0.1 to 0.7% by weight of at least one compound of the formula

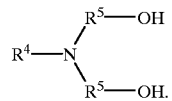

10. The process as claimed in claim 1, wherein the absorption liquid contains from 0.005 to 5% by weight of water.

11. An absorption liquid consisting essentially of:

A) from 0.01 to 4% by weight of at least one compound of the formula

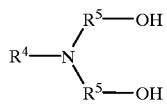

B) from 0.001 to 8.0% by weight of water, and

C) at least one polyalkylene glycol alkyl ether of the formula

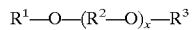

to 100% by weight, where $R^1$ is $C^1$–$C_4$-alkyl, $R^2$ is ethylene or 2-methylethylene, $R^3$ is hydrogen or $C_1$–$C_4$-alkyl, $R^4$ is hydrogen or $C_1$–$C_4$-alkyl, $R^5$ is $C_1$–$C_4$-alkylene and X is an integer from 1 to 10.

12. An absorption liquid as claimed in claim 11, wherein $R^1$ is methyl or butyl;

$R^3$ is hydrogen, methyl or butyl;

$R^4$ is methyl;

$R^5$ is a methylene or ethylene radical; and

X is from 2 to 8.

13. A process for freeing natural gas or synthesis gas of acid-forming impurities in gas or vapor form, which comprises bringing the gases into contact with an absorption liquid as claimed in claim 11 at temperatures of from 20 to 100° C. and pressures of from 1 to 100 atmospheres.

14. A process for freeing natural gas or synthesis gas of acid-forming impurities in gas or vapor form, which comprises bringing the gases into contact with an absorption liquid as claimed in claim 12 at temperatures of from 20 to 100° C. and pressures of from 1 to 100 atmospheres.

* * * * *